(No Model.)

J. B. STEWART.
FRUIT OR VEGETABLE SLICER.

No. 553,271. Patented Jan. 21, 1896.

Witnesses
John C. Shaw.
V. B. Hillyard.

Inventor
James B. Stewart,
By his Attorneys,
C. A. Snow & Co.

UNITED STATES PATENT OFFICE.

JAMES BARDLEY STEWART, OF CHICO, CALIFORNIA.

FRUIT OR VEGETABLE SLICER.

SPECIFICATION forming part of Letters Patent No. 553,271, dated January 21, 1896.

Application filed February 28, 1895. Serial No. 540,082. (No model.)

*To all whom it may concern:*

Be it known that I, JAMES BARDLEY STEWART, a citizen of the United States, residing at Chico, in the county of Butte and State of California, have invented a new and useful Fruit and Vegetable Slicer, of which the following is a specification.

The vital feature of the present invention is the provision of a machine which will cut fruit and vegetables into slices of uniform size and appearance and which will perform the work in a satisfactory and rapid manner. As generally practiced heretofore, where the fruit is sliced by machinery, the slices have been cut by knives placed in parallel relation. Such slices are of graduating sizes, and the end pieces being small and undesirable depreciate the marketable value of such fruit.

By the present invention the slices are cut practically of uniform size and appearance, and the fruit thus prepared finds a quicker market and demands a better price than fruit sliced in the ordinary manner, and no waste results, as there are no small and undesirable pieces to be cast aside.

The improvement consists of a series of circular cutters disposed at different relative angles and converging to approximately a common point, so as to operate on substantially radial lines.

The improvement further consists in disposing the cutters in a progressive series, so that each cutter will operate slightly in advance of the other, the cutters on opposite sides of the central cutter being similarly disposed so as to prevent dragging and injury to the fruit or article to be sliced.

The improvement also consists of the novel features and the peculiar construction and combination of the parts which hereinafter will be more fully described and set forth in the claims, and which are shown in the accompanying drawings, in which—

Figure 1:
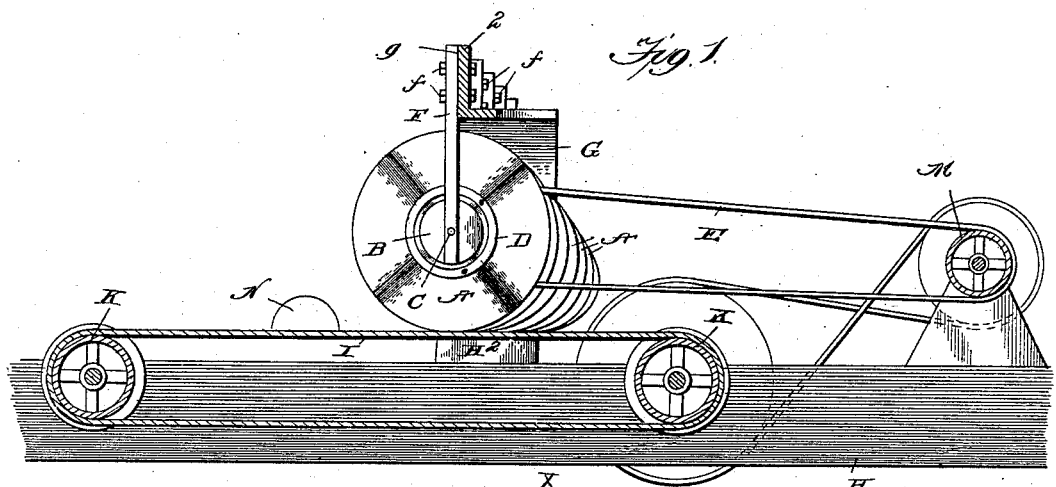
Figure 2:
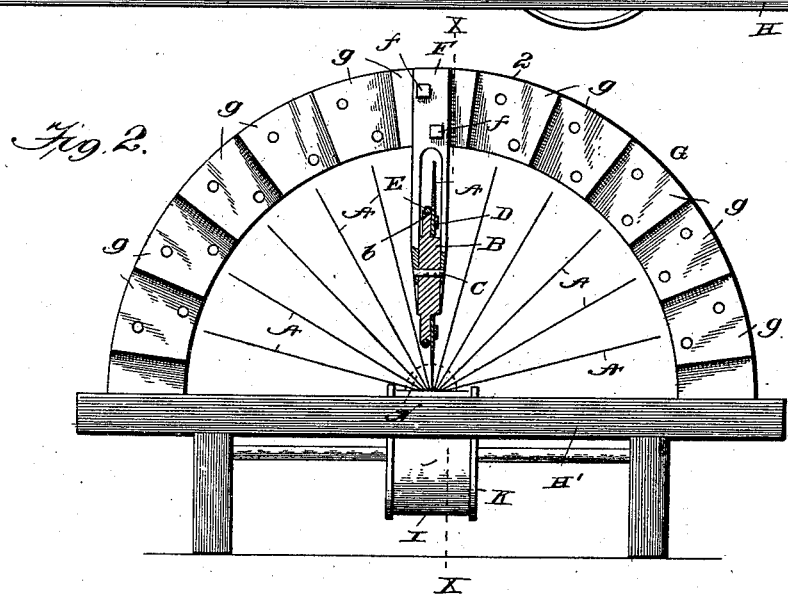
Figure 3:
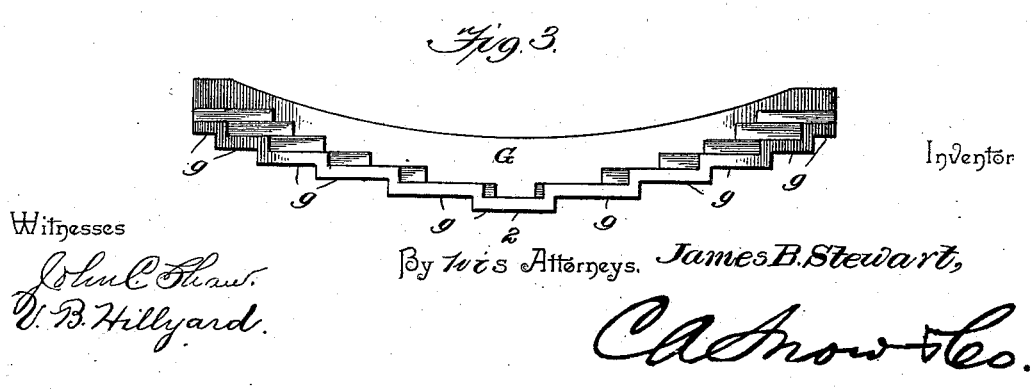

Figure 1 is a longitudinal section of the machine on the line X X of Fig. 2, the end portions of the framework being broken away. Fig. 2 is a front elevation of the machine, the hangers of the cutters on each side of the central cutter being removed and the relative position of the said side cutters being indicated by straight lines, the parts being thus illustrated to obviate confusion and give a better idea of the relative arrangement of the cutters. Fig. 3 is a top plan view of the arch or support for sustaining the hangers in which the cutters are journaled, the said cutters being removed for the sake of clearness of the illustration.

The framework for supporting the operating parts of the machine may be of any desired construction, and, as shown, comprises side beams H and cross-beams H'. The cutters A are disposed at different relative angles, as shown most clearly in Fig. 2, and consist of disks suitably mounted and positively rotated by convenient mechanism, so as to insure their efficient service in attaining a clean and clear cut when slicing the fruit or other article to be separated. There may be as many of these cutters as desired and according to the number of slices into which it may be desired to divide the fruit or article to be sliced.

For attaining a uniform thickness of the slice it is obvious that the cutters will be equally spaced. The lower edges of the cutters do not quite approach a common point because in practice it has not been found feasible to cause them to diverge in true radial lines. However, for all practical purposes, it may be considered that the said cutters occur and occupy approximately radial positions. In the practical organization of the machine the cutters A will be rings of thin sheet metal and will be attached at their inner peripheral edges to cast-metal hubs B, which have an annular flanged portion $b$ grooved in its periphery to receive a belt E, by means of which the cutters are rotated on their journals or support. The cutters are secured in any desired manner to the hub portion, but to secure strength it has been found desirable to provide a metal ring D between which and the flange $b$ the cutter is located and secured by screws passing through the said ring D and cutter and screwing into threaded openings provided in the flange $b$.

The hangers F are secured to a suitable support or arch G and are cleft at one end to receive the cutters, which are journaled in the separated parts by means of a pin or journal C. There will be one hanger for each cutter and it will be secured to the support G by means of bolts $f$ or other suitable fastenings.

The support G is arch-shaped in front elevation and in plan view recedes from a central point on symmetrical lines to give to the cutters A the progressive arrangement indicated in Fig. 1. The rear edge of the support or arch G is formed on a curved line, and its front face is provided with a series of faces *g* to which the hangers F are fastened, said faces forming the seats to receive the hangers. In order to provide a firm bearing for the said hangers a flange 2 is projected vertically from the front edge portion of the support G, to which the hangers F are bolted or firmly attached.

A suitable carrier I is provided to convey the fruit or vegetable N to the cutters to be sliced. This carrier is an endless belt and is supported at its ends on drums K, which are suitably rotated to impart a movement to the carrier. One of the cross-bars, as $H^2$, is located beneath the series of cutters and forms a point of resistance for the carrier I, so as to sustain the fruit N in proper position to be operated upon by the cutters A.

A drum M, rotated from a suitable source of power, is provided to receive the several belts E by means of which the cutters A are rotated. The cutters are arranged in a semicircle, as most clearly indicated in Fig. 2, this disposition being found to give the best results and producing slices of uniform size and appearance.

The fruit, vegetable or other article to be sliced, after being cored or pitted and halved, is placed upon the carrier I and fed thereby to the cutters A, by means of which it is separated and cut into slices of the desired size. The cutting being performed on radial lines, it is manifest that the slices will be approximately of the same shape and size.

Changes in the form, proportion, and the minor details of construction may be resorted to without departing from the principle or sacrificing any of the advantages of this invention.

Having thus described my invention, what I claim is—

1. In a fruit and vegetable cutter, the combination of an arch-shaped support, radially-disposed hangers attached at their outer ends to the said support, and rotary cutters journaled to the inner converging ends of the hangers, and extending on radial lines, substantially as specified.

2. In a fruit and vegetable cutter, the combination of an arch-shaped support, radially-disposed hangers attached at their outer ends to the said support and having their inner converging ends arranged in a progressive series on each side of the central hanger, and rotary cutters journaled to the inner converging ends of the hangers and extending on radial lines, substantially as set forth.

3. In a fruit and vegetable cutter, the combination of an arch-shaped support, radially-disposed hangers attached to the support and having the hangers on each side of the middle hanger receding in a corresponding progressive series, and rotary cutters journaled to the inner ends of the hangers and extending on radial lines and in a similar progressive series to the hangers, substantially as described.

4. In a fruit and vegetable cutter, the combination of an arch-shaped support having a series of faces or seats formed in one face, and having the said seats on each side of the central seat receding in a corresponding progressive series, hangers detachably connected to the said seats and extending on radial lines, and rotary cutters journaled to the inner ends of the hangers and disposed on radial lines and in a similar progressive series to the seats of the arch-shaped support, substantially as described for the purpose specified.

5. A fruit and vegetable cutter comprising an arch-shaped support, hangers detachably connected therewith, rotary cutters journaled to the inner ends of the hangers and arranged in radial lines, and having the cutters on each side of the central cutter disposed in a receding progressive series, mechanism for rotating the cutters, and a feeder for advancing the fruit or vegetables to the cutters, substantially as described.

6. In a fruit and vegetable slicer, the combination with a hanger, of a cutter journaled therein and comprising a hub having a flanged portion to receive the driving belt, and a ring, forming the cutter proper, attached to the said flanged portion of the hub, substantially as set forth.

7. In combination, an approximately arch-shaped support having a vertical flange at one edge, hangers secured to said flange, rotary cutters journaled in the said hangers, and means for operating the cutters, substantially in the manner set forth.

In testimony that I claim the foregoing as my own I have hereto affixed my signature in the presence of two witnesses.

JAMES BARDLEY STEWART.

Witnesses:
W. M. MARVIN,
F. E. HANNAH.